United States Patent
Sakano

(10) Patent No.: US 9,112,385 B2
(45) Date of Patent: Aug. 18, 2015

(54) FORCE-CONTROLLED ELECTRIC HAND

(71) Applicant: FANUC Corporation,
Minamitsuru-gun, Yamanashi (JP)

(72) Inventor: Tetsuro Sakano, Minamitsuru-gun (JP)

(73) Assignee: FANUC Corporation,
Minamitsuru-gun, Yamanashi (JP)

( * ) Notice: Subject to any disclaimer, the term of this patent is extended or adjusted under 35 U.S.C. 154(b) by 11 days.

(21) Appl. No.: 13/945,063

(22) Filed: Jul. 18, 2013

(65) Prior Publication Data

US 2014/0028118 A1 Jan. 30, 2014

(30) Foreign Application Priority Data

Jul. 25, 2012 (JP) ................. 2012-164706

(51) Int. Cl.
| | | |
|---|---|---|
| B25J 15/00 | (2006.01) | |
| H02K 7/00 | (2006.01) | |
| B25J 9/16 | (2006.01) | |
| B25J 13/08 | (2006.01) | |
| B25J 15/02 | (2006.01) | |

(52) U.S. Cl.
CPC ............. *H02K 7/00* (2013.01); *B25J 9/1612* (2013.01); *B25J 13/085* (2013.01); *B25J 15/026* (2013.01); *B25J 13/082* (2013.01); *B25J 15/0253* (2013.01); *Y10S 294/907* (2013.01)

(58) Field of Classification Search
CPC .................................................. B15J 15/026
USPC ................ 73/514.18, 862.626; 361/225, 280
See application file for complete search history.

(56) References Cited

U.S. PATENT DOCUMENTS

| | | | | |
|---|---|---|---|---|
| 4,680,523 | A * | 7/1987 | Goumas et al. | 318/685 |
| 4,765,668 | A * | 8/1988 | Slocum et al. | 294/207 |
| 4,872,803 | A * | 10/1989 | Asakawa | 414/730 |
| 2007/0041817 | A1* | 2/2007 | Kakinuma | 414/490 |
| 2012/0061981 | A1* | 3/2012 | Motonaga et al. | 294/213 |
| 2012/0074724 | A1* | 3/2012 | Kubota et al. | 294/213 |

FOREIGN PATENT DOCUMENTS

| | | |
|---|---|---|
| DE | 10138684 A1 | 2/2003 |
| JP | 2009-148846 A | 7/2009 |
| JP | 2011-183513 A | 9/2011 |
| JP | 2011-194523 A | 10/2011 |

* cited by examiner

*Primary Examiner* — Saul Rodriguez
*Assistant Examiner* — Ronald Jarrett
(74) *Attorney, Agent, or Firm* — Drinker Biddle & Reath LLP

(57) ABSTRACT

A force-controlled electric hand including: an electric motor; a rotary-linear motion conversion mechanism converting rotary motion from the electric motor to linear motion; a pair of finger bases including a movable finger base which moves linearly in parallel with a first axial line through the rotary-linear motion conversion mechanism by power from the electric motor; a pair of fingers fixed to the pair of finger bases to grip a target workpiece by linear motion of the movable finger base; and a force sensor provided at least at one of the pair of finger bases to detect gripping force of the pair of fingers. The force sensor has a pair of parallel beams extending in parallel with a second axial line vertical to the first axial line and detects the gripping force based on an amount of displacement of the parallel beams in a direction of the first axial line.

7 Claims, 4 Drawing Sheets

FORCE-CONTROLLED ELECTRIC HAND

RELATED APPLICATION DATA

This application claims priority under 35 U.S.C. §119 and/or §365 to Japanese Application No. 2012-164706 filed Jul. 25, 2012, the entire contents is incorporated herein by reference.

BACKGROUND OF THE INVENTION

1. Field of the Invention

The present invention relates to a force-controlled electric hand which drives fingers by an electric motor to grip a target workpiece.

2. Description of the Related Art

As this type of force-controlled electric hand, a robot hand attached to an industrial robot is known. When using a robot hand to grip a target workpiece, it is preferable to make the gripping force easily adjustably, so as to apply a large number of types of shapes of target workpieces to be handled. For example, Japanese Unexamined Patent Publication No. 2011-183513A (JP2011-183513A) describes a gripping device which drives a rotary-linear motion conversion mechanism through a speed reduction mechanism by an electric motor and has a pair of fingers which open and close by the rotary-linear motion conversion mechanism. The device described in JP2011-183513A adjusts the gripping force by adjusting the motor current in accordance with characteristics determined in advance by experiments, etc.

In the device described in JP2011-183513A, friction occurs at the speed reduction mechanism, the rotary-linear motion conversion mechanism, and other drive parts. Therefore, the motor torque is reduced by the friction. Since this friction changes along with the lubricated state of the drive parts, the air temperature, aging, etc., it is difficult to precisely control the gripping force by merely adjusting the motor current like in the device described in JP2011-183513A.

On the other hand, a device which detects the gripping force of the fingers and controls the electric motor in accordance with the detected results is known. For example, the device which is described in Japanese Unexamined Patent Publication No. 2011-194523A (JP2011-194523A) includes an elastic member comprised of rubber or plastic foam between a linear motion member moving along a shaft which is driven to rotate by an electric motor and a coupling member coupled to a gripping member to calculate the gripping force from the amount of displacement of the elastic member.

However, the elastic member described in JP2011-194523A easily changes in modulus of elasticity by the temperature. Further, there is a hysteresis property between the elongation and contraction. Further, the material properties easily change along with aging and invasion of lubricating oil or moisture is liable to cause swelling. For this reason, it is difficult to precisely and stably detect the gripping force.

SUMMARY OF THE INVENTION

According to an aspect of the present invention, a force-controlled electric hand includes an electric motor; a rotary-linear motion conversion mechanism converting rotary motion from the electric motor to linear motion; a pair of finger bases including a movable finger base which moves linearly in parallel with a first axial line through the rotary-linear motion conversion mechanism by power from the electric motor; a pair of fingers fixed to the pair of finger bases to grip a target workpiece by linear motion of the movable finger base; and a force sensor provided at least at one of the pair of finger bases to detect gripping force of the pair of fingers. The force sensor has a pair of parallel beams extending in parallel with a second axial line vertical to the first axial line and detects the gripping force based on an amount of displacement of the parallel beams in a direction of the first axial line.

BRIEF DESCRIPTION OF THE DRAWINGS

The object, features, and advantages of the present invention will become clearer from the following explanation of embodiments given with reference to the attached drawings, in which.

DETAILED DESCRIPTION

First Embodiment

Figure 1:
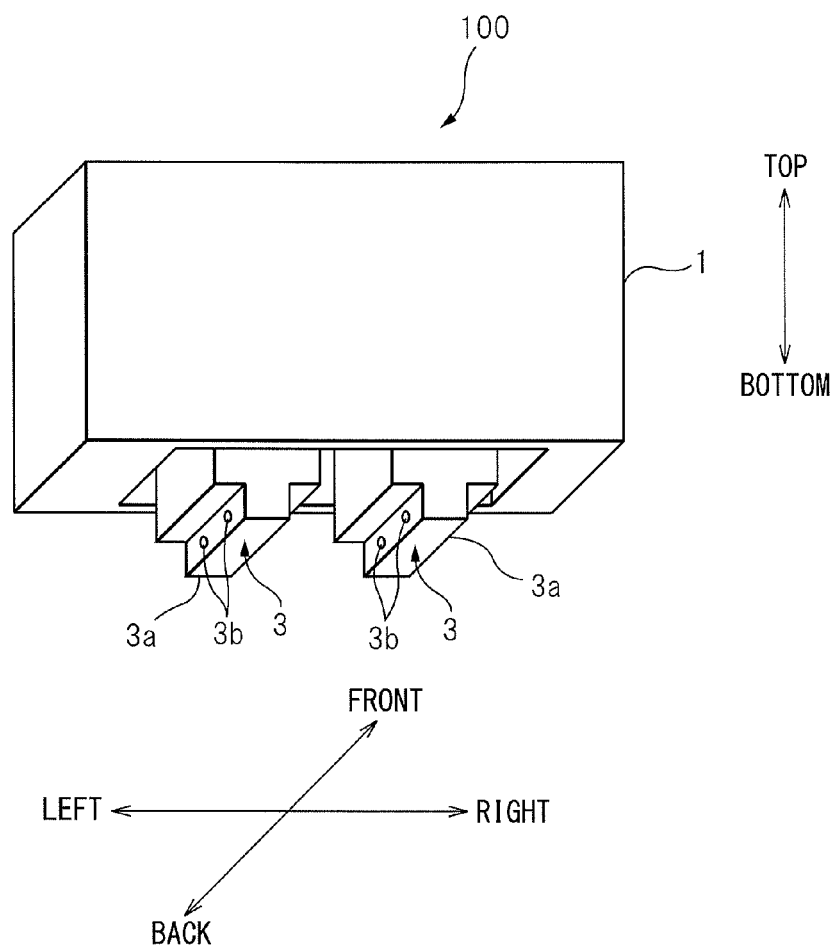
FIG. 1 is a perspective view which shows the overall configuration of a force-controlled electric hand according to a first embodiment of the present invention.

Hereinafter, referring to FIG. 1 to FIG. 3, a first embodiment of the present invention will be explained. FIG. 1 is a perspective view which shows the overall configuration of a force-controlled electric hand 100 according to a first embodiment of the present invention (below, sometimes simply referred to as an "electric hand"). This electric hand 100, for example, is attached to the front end of an arm of an industrial robot for gripping a target workpiece (below, sometimes simply referred to as a "workpiece"). It has an openable and closable pair of fingers (see FIG. 2). However, in FIG. 1, illustration of this is omitted.

Below, for convenience, the three directions which perpendicularly intersect each other like illustrated will be defined as the front-back direction, the left-right direction, and the top-bottom direction and the configuration of the parts will be explained in accordance with those definitions. The "left-right direction" is the direction in which the pair of fingers open and close, while the "top-bottom direction" is the direction in which the fingers extend. As shown in FIG. 1, the electric hand 100 has a box-shaped case 1 with an open bottom end. Components are arranged inside of the case 1.

Figure 2:
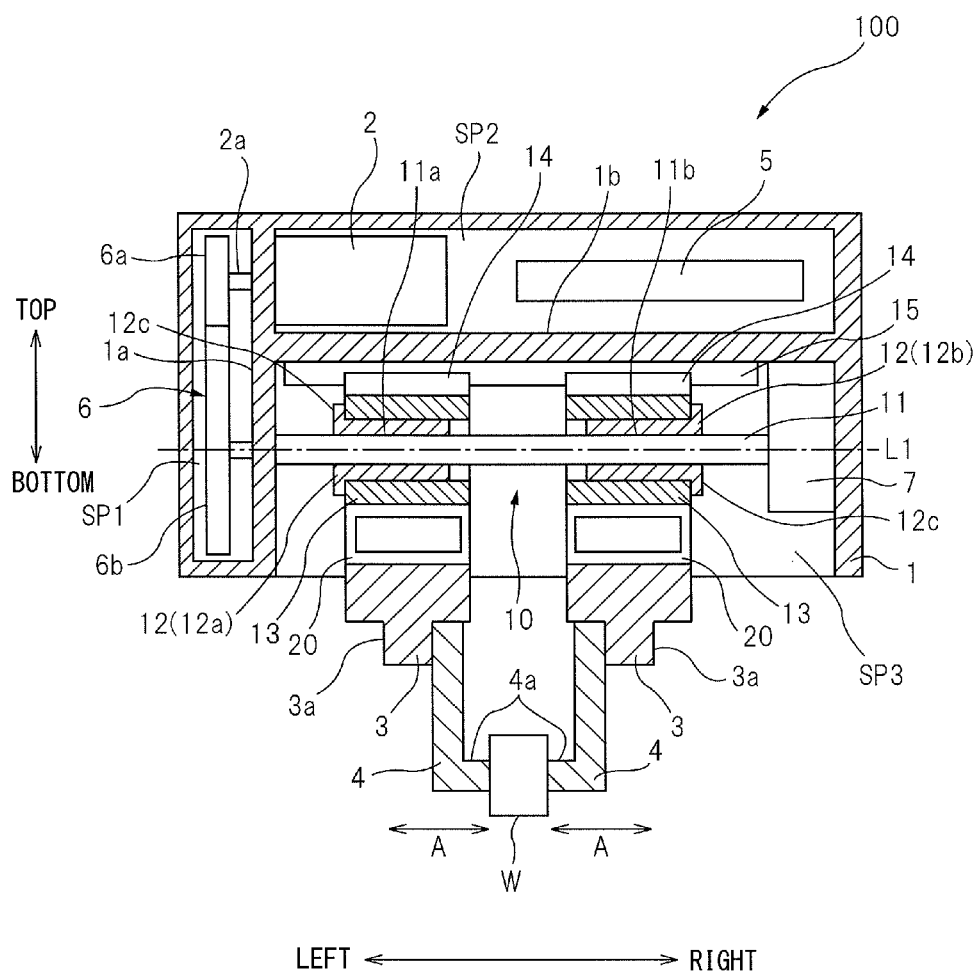
FIG. 2 is a longitudinal cross-sectional view which shows the principal configuration of a force-controlled electric hand according to the first embodiment of the present invention.

FIG. 2 is a longitudinal cross-sectional view which shows the principal configuration of the electric hand 100 according to a first embodiment. As shown in FIG. 2, the electric hand 100 has an electric motor 2, a rotary-linear motion conversion mechanism 10 which converts the rotary motion of the electric motor 2 to linear motion, a pair of finger bases 3 which move linearly through the rotary-linear motion conversion mechanism 10, and a pair of fingers 4 which are fastened to the pair of finger bases 3.

Inside the case 1, a partition wall 1a which extends in the top-bottom direction and a partition wall 1b which extends in the left-right direction divide the space into the spaces of a left space SP1, a top space SP2, and a bottom space SP3. At the top space SP2, an electric motor 2 which can operate forward and in reverse is arranged. An output shaft 2a of the electric motor 2 sticks out to the left from the left end face of the electric motor 2 and passes through the partition wall 1a. In the top space SP2, a control circuit 5 is arranged at the right of the electric motor 2.

At the left space SP1, a transmission mechanism 6 is arranged for transmitting rotation of the electric motor 2 to the rotary-linear motion conversion mechanism 10. The transmission mechanism 6 is comprised of gears or a timing belt and pulley etc. In FIG. 2, a gear 6a which is connected to a front end of the output shaft 2a of the electric motor 2 and a gear 6b which is arranged below the gear 6a and engages with the gear 6a constitute the transmission mechanism 6. The transmission mechanism 6 also functions as a speed reduction mechanism and slows down rotation of the electric motor 2 to increase the torque.

At the bottom space SP3, the rotary-linear motion conversion mechanism 10 is arranged. The rotary-linear motion conversion mechanism 10 has a feed screw 11 which extends along the axial line L1 of the left-right direction, a left and right pair of nuts 12 which screw with the feed screw 11, cylindrical shaped nut covers 13 which cover the circumferential surfaces of the nuts 12, a left and right pair of sliders 14 which are fastened to the circumferential surfaces of the nut covers 13, and a guide 15 which restricts the movement direction of the sliders 14. Among the left and right pair of nuts 2, the left side nut will be denoted by 12a, while the right side nut will be denoted by 12b. The left end of the feed screw 11 passes through the partition wall 1a and is supported rotatably and is coupled with the shaft of the gear 6b. The right end of the feed screw 11 is coupled to the rotation detector 7 which is fastened to the inside surface of the case 1. The rotation detector 7 detects the rotational angle of the feed screw 11.

The signal from the rotation detector 7 is input to the control circuit 5 and, for example, is used for control of the rotational angle of the feed screw 11 (servo control). When the electric motor 2 used for the servo control has a built-in rotation detector, this rotation detector 7 is unnecessary. It is difficult to directly couple a rotation detector to an inexpensive DC motor or other motor which does not have a built-in rotation detector. However, in the present embodiment, since the rotation detector 7 is coupled to the end of the feed screw 11 at the opposite side to the transmission mechanism 6, the rotation detector 7 can be easily and inexpensively coupled.

The feed screw 11 has a thread 11a which is formed at the left side from the center part in the left-right direction and a thread 11b which is formed at the right side. For example, the thread 11a is a forward thread (right-hand thread), while the thread 11b is a reverse thread (left-handed thread). At these threads 11a and 11b, nuts 12a and 12b with outer circumferences comprised of cylindrical surfaces are screwed. At the left end of the nut 12a and the right end of the nut 12b, flanges 12c which project out in the radial direction are provided. The nuts 12a and 12b are respectively fit into the inner circumferential surfaces of the cylindrical shaped nut covers 13 and connected by the bolts which pass through the flanges 12c (not shown) to be integrally connected to the nut covers 13.

The guide 15 is a rail extending in the left-right direction and is fastened to the bottom surface of the partition wall 1b. The sliders 14 are fastened to the top parts of the outer circumferential surfaces of the nut covers 13. The sliders 14, for example, have U-shapes in cross-section. The sliders 14 are arranged so as to be straddle the front surface and back surface of the guide 15 and engage slidably with the guide 15 along the front-back surfaces of the guide 15 through balls or other lubricating members. Due to this, rotation of the nuts 12 is prevented and the nuts 12 can move in only the left-right direction integrally with the nut covers 13 and the sliders 14.

At the bottom ends of the left and right nut covers 13, that is, at the opposite sides in the diametrical direction of the mounting locations of the sliders 14 across the nuts 12, the force sensors 20 are fastened. The force sensors 20 detect the force in the opening and closing direction of the fingers 4, that is, the gripping force of the fingers 4. The detailed structure of the force sensor will be explained later. At the bottom ends of the force sensors 20, cross-sectionally finger bases 3 with projecting parts 3a projecting downward are fastened. At the projecting parts 3a of the finger bases 3, screw holes 3b are provided (see FIG. 1), so that the fingers 4 are attached to the finger bases 3 through bolts (not shown) in a detachable manner.

The fingers 4 extend in the up-down direction and are provided at the front ends (bottom ends) with projecting parts 4a which project out to one side in the left-right direction (inside in left-right direction). The fingers 4 are attached to the finger bases 3 so that their projecting parts 4a face each other at the same heights in the up-down direction. The fingers 4 used are ones designed to suitable lengths and shapes for the size and weight of the gripped target workpiece.

In the above configuration, if the electric motor 2 turns, the rotation of the electric motor 2 is transmitted through the transmission mechanism 6 to the feed screw 11 whereby the feed screw 11 turns. Due to this, the sliders 14 move together with the nuts 12 in the left-right direction while being limited in movement direction by the guide 15. In this case, since the left and right threads 11a and 11b of the feed screw 11 are formed in opposite directions to each other, the pair of nuts 12a and 12b move linearly in the opposite directions to the left and right in parallel with the axial line L1 as shown by the arrow A. Due to this movement of the nuts 12a and 12b, the pair of fingers 4 approach and separate to enable a closing and opening operation, that is, an operation for gripping the target workpiece W.

During the opening and closing operation of the fingers 4, the rotational angle of the feed screw 11 is detected by the rotation detector 7, and a detection signal is input to the control circuit 5. The control circuit 5 use a command signal from a not shown control device which is provided at the outside of the electric hand 100 and a detection signal from the rotation detector 7 as the basis for feedback control of the electric motor 2. Due to this, it can control the positions of the fingers 4. The control circuit 5 also receives as input the detection signals of the gripping force detected by the force sensors 20. Due to this, the control circuit 5 can use a command signal from the not shown control device and detection signals from the force sensors 20 as the basis for feedback control of the electric motor 2. Therefore, it is possible to control the gripping force.

In the present embodiment, since the control circuit 5 is housed at the inside of the electric hand 100, all of the circuits for controlling and driving the electric hand 100 can be housed inside of the electric hand 100. Due to this, the circuit configuration becomes compact and the number of parts of the circuit is reduced. Along with this, the circuit at the outside control device side can be simplified and the overall cost, including the control device, can be reduced. On the other hand, when the power consumption of the electric motor 2 is large and the motor drive circuit is difficult to mount in the control circuit 5, the motor drive circuit is, for example, installed in the outside control device. In this case, the control circuit 5 may be configured so as to output the signals from the force sensors 20 and rotation detector 7 to the outside control device. Due to this, the circuit configurations of the force sensors 20 and the rotation detector 7 inside the electric hand 100 can be simplified and the electric hand 100 can be made smaller in size.

Here, the configuration of the force sensors 20 which are used in the electric hand 100 of the present embodiment will be explained. FIG. 3 is an enlarged view of the principal part of FIG. 2, which shows the configuration of a force sensor 20 (for example, left side force sensor 20 of FIG. 2). As shown in FIG. 3, the force sensor 20 has a fixed base 21 with a top surface fastened to the nut cover 13, a movable base 22 which is arranged facing the fixed base 21 below the fixed base 21, and a left and right pair of plate-shaped beams 23 which extend in the top-bottom direction and connect the left and right ends of the fixed base 21 and movable base 22. A space SP4 is formed at the inside of the fixed base 21, movable base 22, and pair of beams 23. The front-back direction lengths of the respective parts 21 to 23 are equal to each other, for example, are the same as the front-back direction length of the finger base 3 (see FIG. 1). At the bottom surface of the movable base 22, the finger base 3 is fastened. If the finger 4 grips the workpiece W with the gripping force F, as shown in the figure, the finger base 3 is acted on by an external force (reaction force) F' equal in magnitude to the gripping force F from the workpiece W to the outside in the left-right direction, whereby the beam 23 of the force sensor 20 flexes.

At the space SP4, a box-shaped pair of electrode blocks 24 and 25 are arranged. The top end face of the one electrode block 24 is fastened to the fixed base 21, while the bottom end face of the other electrode block 25 is fastened to the movable base 22. The electrode blocks 24 and 25 are arranged in parallel with each other and apart from each other by a predetermined distance in the left-right direction. At the mutually facing faces of the electrode blocks 24 and 25, electrodes 24a and 25a are formed. Between the electrodes 24a and 25a, there is a gap GP. The force sensor 20 detects the electrostatic capacity between the electrodes 24a and 25a which corresponds to the size of the gap GP. The size of the gap GP changes depending on the external force F' which is applied to the finger base 3. If the size of the gap GP changes, the electrostatic capacity between the electrodes 24a and 25a changes. For this reason, by detecting the electrostatic capacity, it is possible to detect the external force F', that is, the gripping force F.

The electrodes 24a and 25a are, for example, formed by bonding flexible printed circuits to the electrode blocks 24 and 25. These flexible printed circuits can be extended to be connected to the control circuit 5 whereby a simple configuration can be used to detect the electrostatic capacity. When forming the electrodes 24a and 25a, the surfaces of the electrode blocks 24 and 25 can be treated to make them insulated and electroless plating etc. may be used to form metal films. It is also possible to form the force sensors 20 and one electrode block (for example, 24) by a metal material and connect them to the ground, and to detect the electrostatic capacity with respect to the ground potential. Due to this, one electrode 24a becomes unnecessary and the structure can be simplified.

Figure 3:
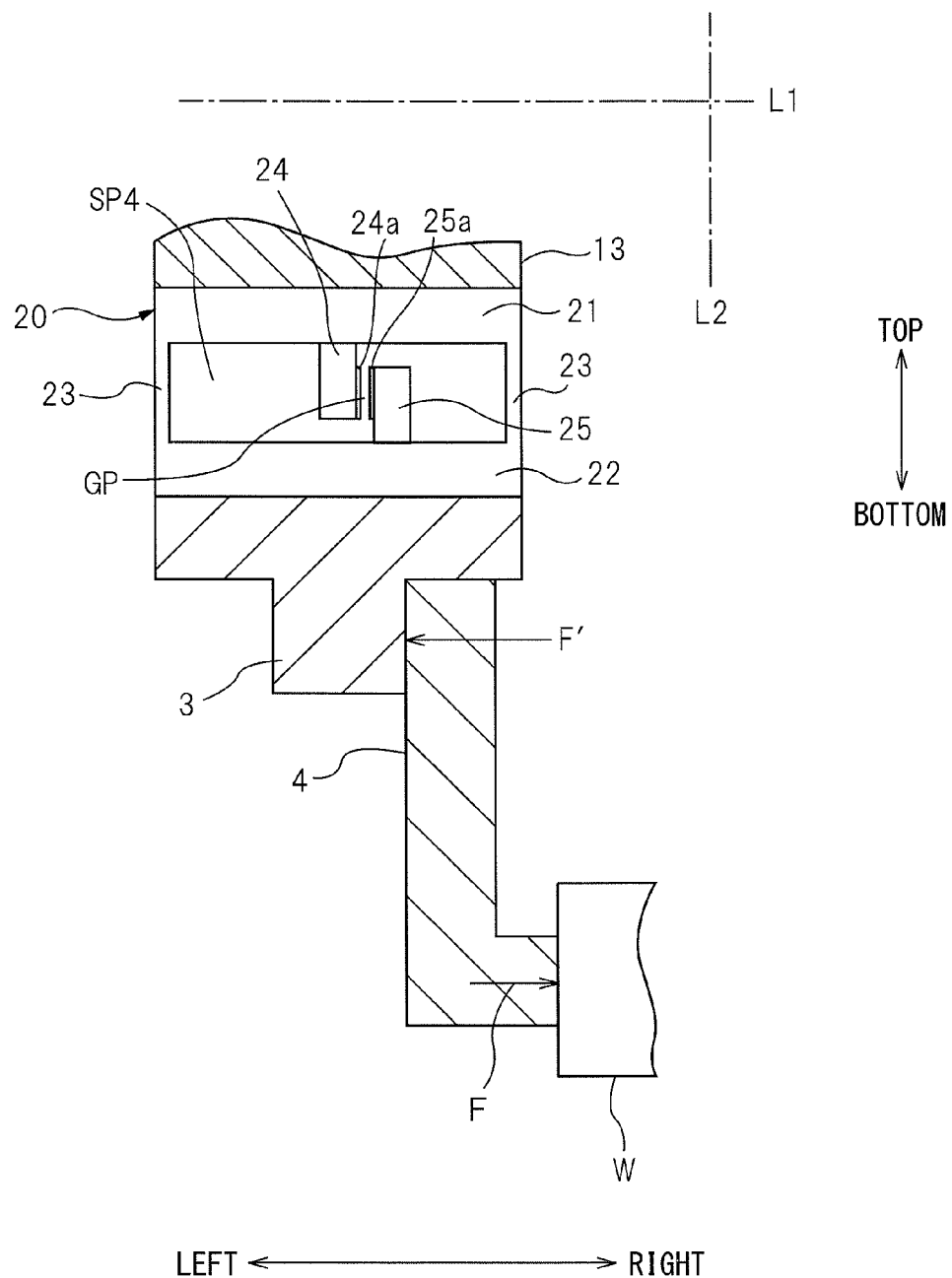
FIG. 3 is a view which shows the detailed configuration of the force sensor of FIG. 2.

In FIG. 3, if designating the axial line which extends in the up-down direction vertical to the axial line L1 in the left-right direction (for example, the axial line which passes through the middle part of the feed screw 11 in the left-right direction) as "L2", the force sensors 20 of the present embodiment have a left and right pair of parallel beams 23 which extend parallel with the axial line L2. If the fingers 4 grip the workpiece W by the gripping force F at their tips, the fingers 4 are acted on by an external force F' (reaction force) equal in magnitude to the gripping force F but in an opposite direction. This external force F' acts on the support parts of the sliders 14 on the guide 15 through the fingers 4, the finger bases 3, and the nut covers 13. In the path of transmission of the external force F', the plate thickness of the beams 23 in the left-right direction is the thinnest, so the beams 23 easily deform in the left-right direction. For this reason, the force sensors 20 can detect the gripping force F in the left-right direction with a good sensitivity.

When the fingers 4 grip the workpiece W, the force sensors 20 are acted on by a bending moment through the fingers 4 and the finger bases 3, and the left and right beams 23 are acted on by a compressive force and a tensile force. In this case, the beams 23 do not easily deform in the up-down direction, that is, the longitudinal direction, and the rigidity against the bending moment is high. For this reason, the force sensors 20 are not affected by the bending moment and can detect only the gripping force F in the left-right direction. Further, if the fingers 4 change in length or the positions of the fingers 4 in the longitudinal direction which grip the workpiece W change, the bending moment which acts on the force sensors 20 changes. However, the force sensors 20 can precisely detect the gripping force F in the opening-closing direction of the fingers 4 regardless of the magnitude of the bending moment.

As shown in FIG. 2, in the present embodiment, above the finger bases 3, the nuts 12 of the rotary-linear motion conversion mechanism 10 are arranged. Further above those, the sliders 14 are arranged. That is, the nuts 12 are arranged between the finger bases 3 and the sliders 14. According to this configuration, the nuts 12 and the sliders 14 can easily be made integral, so, for example, compared to when the sliders 14 are arranged above the finger bases 3 and the nuts 12 are arranged above those, the configuration can be simplified and the assembly becomes easy.

In the present embodiment, the fingers 4, the finger bases 3, the force sensors 20, the nut covers 13, and the sliders 14 are formed integrally. Therefore, the maximum bending moment due to the gripping force F of the fingers 4 acts on the sliders 14 which are the furthest from the fingers 4. According to the configuration, like in the present embodiment, arranging the nuts 12 between the finger bases 3 and the sliders 14, the load due to this bending moment can be lightened. Below, this point will be explained.

The gripping force F of the fingers 4 is generated by the linear thrust of the nuts 12 due to rotation of the feed screw 11. The linear thrust of the nuts 12 acts to the inside in the left-right direction, while the fingers 4 are acted on by a reaction force F' from the workpiece W to the outside in the left-right direction. That is, the nuts 12 and the fingers 4 are acted on by forces in opposite directions to the left and right from each other. For this reason, the direction (rotational direction) of the bending moment (referred to as "the first bending moment") which acts on the sliders 14 due to the gripping force F (reaction force F') of the fingers 4 and the direction of the bending moment (referred to as "the second bending moment") which acts on the sliders 14 due to the linear thrust of the nuts 12 become opposite to each other. Therefore, part of the first bending moment is cancelled by the second bending moment and the load due to the bending moment which acts on the sliders 14 can be lightened. As a result, the durability of the linear guide mechanism comprised of the sliders 14 and the guide 15 can be improved.

As opposed to this, for example, when arranging the sliders 14 between the finger bases 3 and the nuts 12, the direction of the first bending moment acting on the sliders 14 due to the gripping force F (reaction force F') of the fingers 4 and the direction of the second bending moment acting on the sliders 14 due to the linear thrust of the nuts 12 become the same as each other. For this reason, the first bending moment and the second bending moment are applied to the sliders 14 added together. As a result, the durability of the linear guide mechanism to fall is worsened.

According to the first embodiment, the following actions and effects can be exhibited:

(1) The electric motor 2, the rotary-linear motion conversion mechanism 10 which converts the rotational motion of the electric motor 2 to linear motion, the pair of finger bases 3 which move linearly in parallel with the axial line L1 through the rotary-linear motion conversion mechanism 10, the pair of fingers 4 which are fastened to the pair of finger bases 3 and which grip the workpiece W by linear motion of the finger bases 3, and the force sensors 20 which are provided at the pair of finger bases 3 and which detect the gripping force F of the pair of fingers 4 constitute the electric hand 100. Further, the force sensors 20 have pairs of parallel beams (beams 23) which extend in parallel with the axial line L2 vertical to the axial line L1 and use the amounts of displacement of the parallel beams as the basis to detect the gripping force F. Due to this, the force sensors 20 are not easily affected by temperature, aging, etc. and can precisely and stably detect the gripping force F when the workpiece W is gripped by the fingers 4. Further, since the force sensors 20 are provided at the base (top parts) of the finger bases 3 to which the fingers 4 are attached, the force F' which acts on the fingers 4 is directly transmitted to the force sensors 20 and the gripping force F can be precisely detected.

(2) When adjusting the motor current to adjust the gripping force, friction at the transmission mechanism 6 or the rotary-linear motion conversion mechanism 10 causes the motor torque to fall, so it is difficult to precisely detect a small gripping force F. In this regard, in the present embodiment, since force sensors 20 which have parallel beams are used, the sensitivity of detection of the gripping force F is excellent and the gripping force F can be controlled over a wide range.

(3) Force sensors 20 which have parallel beams, that is, parallel beam structure force sensors 20, are used to detect the gripping force F, so the force sensors 20 are not easily affected by the bending moment from the fingers 4 and the gripping force F can be accurately detected. More specifically, the electric hand 100 has fingers 4 which is attached to it and which differ in length according to the workpiece W, and the bending moment changes in proportion to the lengths of the fingers 4. However, since a parallel beam structure experiences little deformation with respect to bending moment, the gripping force F can be precisely detected.

(4) The fingers 4 stick out from the bottom surface of the electric hand 100. Therefore, when handling the electric hand 100 etc., the finger 4 are liable to be acted on by some sort of impact force and the force sensors 20 are liable to be acted on by bending moment due to the impact force. On this point, in the present embodiment, since parallel beam structure force sensors 20 are used, the force sensors 20 are strong against impact force and are excellent in durability.

(5) The feed screw which extends along the axial line L1 and which has the power from the electric motor 2 input to it, the nuts 12 which are screwed with the feed screw 11, the nut covers 13 which cover the nuts 12, the sliders 14 which are fastened to the circumferential surfaces of the nut covers 13, and the guide 15 which limits the movement direction of the sliders 14 so that the sliders 14 move in parallel with the axial line L1 constitute the rotary-linear motion conversion mechanism 10. Further, the finger bases 3 are fastened to the circumferential surfaces of the nuts 12 at the opposite sides (bottom) in the diametrical direction from the locations (top) where the sliders 14 are fastened. Due to this, the direction (rotational direction) of the first bending moment which acts on the sliders 14 due to the gripping force F of the fingers 4 and the direction of the second bending moment which acts on the sliders 14 due to the linear thrust of the nuts 12 become opposite to each other, so the load due to the bending moment which acts on the sliders 14 can be lightened.

(6) The transmission mechanism 6 is provided to transmit the rotation of the output shaft 2a of the electric motor 2 to the feed screw 11. Therefore, it is possible to arrange the electric motor 2 above the rotary-linear motion conversion mechanism 10 with the output shaft 2a facing a direction parallel with the axial line L1 (left-right direction) and possible to configure the electric hand 100 to be compact.

(8) At the right end part of the feed screw 11, the rotation detector 7 is coupled for detection of the amount of rotation of the feed screw 11. Therefore, as the electric motor 2, it is possible to use an inexpensive DC motor etc. which does not have a built-in rotation detector 7. At the left end part of the feed screw 11, the transmission mechanism 6 is coupled for input of power from the electric motor 2 and the rotation detector 7 is coupled at the opposite side (right direction) from the transmission mechanism 6 in the left-right direction, so the rotation detector 7 can be easily set and coupled.

(9) The force sensors 20 are configured as electrostatic capacity-type force sensors and the amounts of displacement of the force sensors 20 are detected by the change of the electrostatic capacity. Therefore, the electric hand 100 can be made smaller in size and assembly is easy.

Second Embodiment

Figure 4:
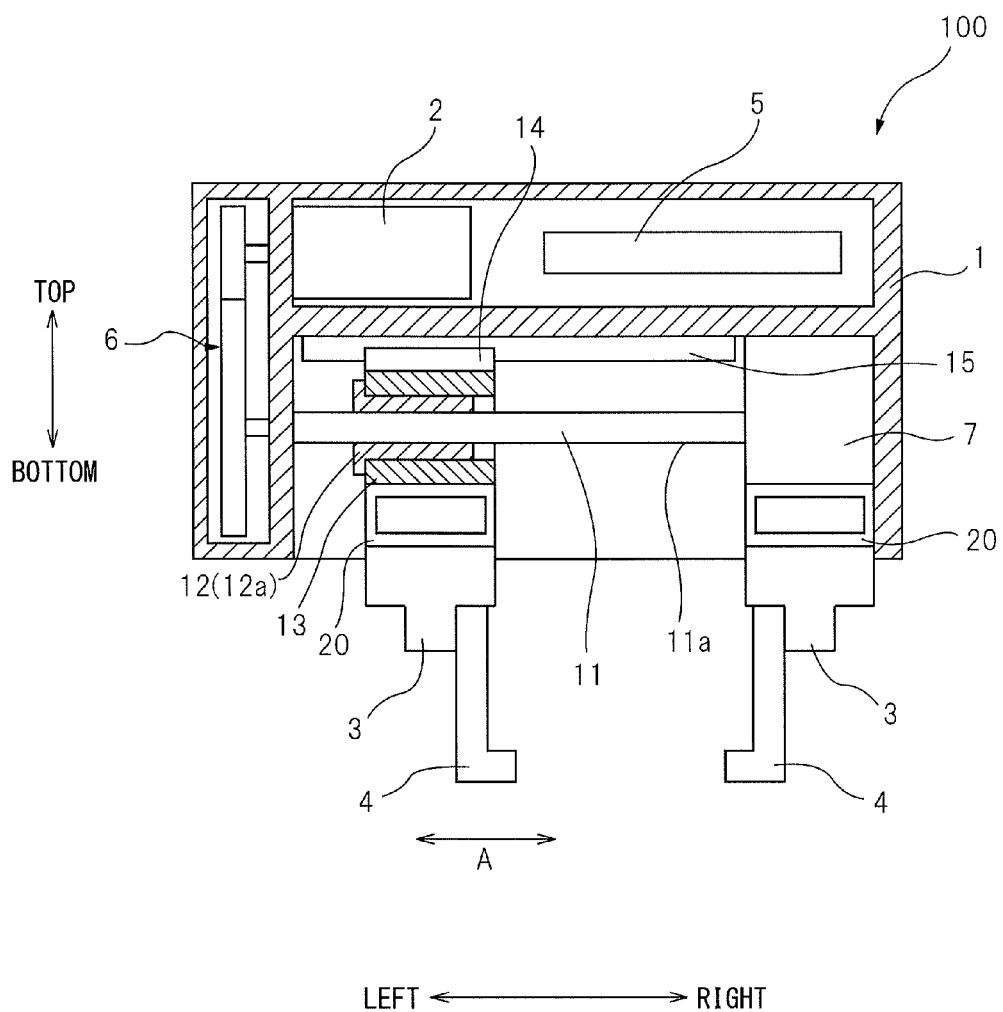
FIG. 4 is a longitudinal cross-sectional view which shows the principal configuration of a force-controlled electric hand according to a second embodiment of the present invention.

Referring to FIG. 4, a second embodiment of the present invention will be explained. The second embodiment particularly differs from the first embodiment in the configuration of the finger bases 3. That is, in the first embodiment, the pair of finger bases 3 are configured as movable finger bases movably in the left-right direction. However, in the second embodiment, only one of the pair of finger bases 3 is movably configured. Such an electric hand 100 is called a "one-sided type hand".

FIG. 4 is a cross-sectional view which shows the principal constitution of an electric hand 100 according to the second embodiment. The same portions as in FIG. 2 are assigned the same references. Below, the points of difference from the first embodiment will mainly be explained. As shown in FIG. 4, the right side force sensor 20 among the left and right pair of force sensors 20 is fastened to the bottom surface of the rotation detector 7. For this reason, in the second embodiment, the right side nut 12b, nut cover 13, and slider 14 are unnecessary. Further, the feed screw 11 is, for example, configured by only a thread 11a formed with a forward thread.

Due to this, the configuration of the electric hand 100 is simplified, the number of parts can be cut, and the cost can be reduced. Further, in the second embodiment, since the right side force sensor 20, finger base 3, and finger 4 are arranged below the rotation detector 7, compared with FIG. 2, the length of the electric hand 100 in the left-right direction can be shortened. Due to this, the electric hand 100 can be reduced in size. The rotation detector 7 and the force sensors 20 may also be separated and provided separately inside of the electric hand 100.

Modifications

In the above embodiments (FIGS. 2 and 4), force sensors 20 are provided at the base of the left and right finger bases 3. However, the forces F' which act against the gripping force F from the left and right fingers 4 are equal to each other, so it is also possible to provide only one of the finger bases 3 with a force sensor 20. For example, in the configuration of FIG. 4 which has a left side finger base 3 (movable finger base) and a right side finger base 3 (fixed finger base) which is separated from this movable finger base in the direction of the axial line L1 and is arranged facing this movable finger base, if not providing the left side finger base 3 (movable finger base) with a force sensor 20 and providing the right side finger base 3 (fixed finger base) with a force sensor 20, the signal wiring of the force sensor 20 becomes easy and the cost can be reduced.

In the above embodiments (FIGS. 2 and 4), although the feed screw 11, nuts 12, nut covers 13, sliders 14, and guide 15 are used to form the rotary-linear motion conversion mechanism 10, the configuration of the rotary-linear motion conversion mechanism 10 is not limited to the one explained above. For example, instead of the feed screw 11 and the nuts 12, a rack and pinion may also be used and a rotary cam may also be used. Instead of separately providing the movable base 22 of the force sensor 20 and the finger base 3, these may also be configured as a single member and the finger base 3 may be made to include the force sensor 20. Further, in FIG. 2, the finger base 3, the force sensor 20, and the nut cover 13 may be configured by a single member. In FIG. 4, the finger base 3, force sensor 20, and rotation detector 7 may be configured by a single member as well. That is, the configuration providing the finger base 3 with a force sensor 20 is not limited to those of the above embodiments.

In the above embodiments (FIGS. 2 and 4), the sliders 14 are fastened to the nut covers 13. However, the nut covers 13 may be omitted and the sliders 14 may be fastened to the circumferential surfaces of the nuts 12. That is, rather than provide the nuts 12 and the nut covers 13 integrally to form the nut parts, the nuts 12 alone may be made the nut parts. In the above embodiments, the sliders 14 are fastened to the circumferential surfaces (top parts) of the nut parts (nut covers 13) and the finger bases 3 are provided at the opposite sides (bottom parts) in the diametrical direction from the locations where the sliders 14 are fastened. However, the arrangement of the nut parts, the sliders 14, and the finger bases 3 is not limited to this.

In the above embodiments (FIG. 2), forward threads and reverse threads are formed at the feed screw 11 in the left-right direction of the feed screw 11 from the center part. However, for example, the feed screw 11 may also be formed with only the forward thread and the orientations of the screw holes of the left and right nuts 12 may be made different from each other. In the above embodiments (FIGS. 2 and 4), the transmission mechanism 6 is coupled with the left end part of the feed screw 11 and the rotation detector 7 is coupled with the right end part. However, the arrangement of the transmission mechanism 6 and the rotation detector 7 is also not limited to the one explained above. Instead of the rotation detector 7, another position detector may be provided to detect the position of the fingers 4. In the above embodiments, the rotation of the output shaft 2a of the electric motor 2 is transmitted through the transmission mechanism 6 to the rotary-linear motion conversion mechanism 10 (feed screw 11). However, the transmission mechanism 6 may also be omitted and the rotation of the electric motor 2 directly input to the rotary-linear motion conversion mechanism 10.

In the above embodiments, the pair of finger bases 3 (FIG. 2) or single finger base 3 (FIG. 4) moving linearly along the axial line L1 (first axial line) are provided as the movable finger bases and force sensors 20 (FIG. 3) having pairs of beams 23 (parallel beams) extending parallel with the axial line L2 (second axial line) vertical to the axial line L1 are provided. However, the first axial line and the second axial line may be set at any positions so long as they are vertical to each other.

Instead of configuring the force sensors 20 as an electrostatic capacity-type force sensor to detect the amount of displacement of the parallel beams by electrostatic capacity, strain gauges may be used to configure the force sensors 20. In this case, since large strain is generated at the root parts of the beams 23, it is preferable to attach strain gauges in their vicinity. It is also possible to attach strain gauges at a plurality of locations of the force sensors 20 and detect not only the gripping force F, but also the load due to the moment. Although the force sensors 20 include mutually parallel pairs of beams 23, may also include three or more parallel beams.

The above embodiments may be freely combined with one or more of the modifications.

According to the present invention, since the finger bases which hold the fingers of the electric hand are provided with force sensors which have a pair of parallel beams which extend vertical to the movement direction of the finger bases, the gripping force when the target workpiece is gripped by the fingers can be precisely and stably detected.

Above, the present invention was explained with reference to preferred embodiments, but a person skilled in the art would understand that various corrections and modifications may be made without departing from the scope of disclosure of the later explained claims.

The invention claimed is:

1. A force-controlled electric hand, comprising:
   an electric motor;
   a rotary-linear motion conversion mechanism converting rotary motion from the electric motor to linear motion;
   a pair of finger bases including a movable finger base, the movable finger base moving linearly in parallel with a first axial line through the rotary-linear motion conversion mechanism by power from the electric motor;
   a pair of fingers fixed to the pair of finger bases to grip a target workpiece by linear motion of the movable finger base; and
   a force sensor provided at least at one of the pair of finger bases to detect gripping force of the pair of fingers, the force sensor including a pair of parallel beams extending in parallel with a second axial line vertical to the first axial line, and including an electrostatic capacity type force sensor detecting the amount of displacement of the parallel beams to detect the gripping force in a direction of the first axial line based on an amount of displacement of the parallel beams in the direction of the first axial line.

2. The force-controlled electric hand according to claim 1, wherein the rotary-linear motion conversion mechanism comprises:
   a feed screw extending in parallel with the first axial line, the power from the electric motor being input to the feed screw;
   a nut part screwed with the feed screw;
   a slider fastened to a circumferential surface of the nut part; and
   a guide limiting a movement direction of the slider so that the slider moves in parallel with the first axial line, and
   wherein the movable finger base is provided at a circumferential surface of the nut part at an opposite side in a diametrical direction from a location where the slider is fastened.

3. The force-controlled electric hand according to claim 2, wherein the electric motor has an output shaft extending in parallel with the first axial line, and wherein the force-controlled electric hand further comprises a transmission mechanism transmitting rotation of the output shaft to the feed screw.

4. The force-controlled electric hand according to claim 2, further comprising a position detector detecting a position of the fingers,
wherein the position detector includes a rotation detector connected to one end part of the feed screw to detect an amount of rotation of the feed screw, and a controller for calculating the position of the fingers from the amount of rotation.

5. The force-controlled electric hand according to claim 1, wherein the pair of finger bases are comprised of the movable finger base and a fixed finger base separated from the movable finger base in a direction of the first axial line and arranged facing the movable finger base.

6. The force-controlled electric hand according to claim 1, wherein an opening is formed between the pair of parallel beams, and the displacement of the parallel beams causes approximation of elements of an electrostatic capacity type force sensor.

7. The force-controlled electric hand according to claim 1, wherein an opening is formed between the pair of parallel beams, and an electrostatic capacity type force is located inside the opening.

* * * * *